2,985,593
SCINTILLATOR COMPOSITION

Edward Broderick, Perkasie, and Samuel Loshaek, Hatboro, Pa., assignors to The Borden Company, New York, N.Y., a corporation of New Jersey No Drawing. Filed Sept. 26, 1958, Ser. No. 763,440

4 Claims. (Cl. 252—301.2)

This invention relates to a scintillator of the class used to detect and measure the intensity of ionizing radiations such as radiations of alpha, beta, and gamma particles.

Scintillators conventionally absorb the incident energy and convert it to luminous light whose intensity is then measured with a photomultiplier tube apparatus which converts the luminuous light to electric impulses of magnitude that may be recorded in terms of pulse heights.

More specifically, the scintillators ordinarily comprise a medium that absorbs the incident radiation and one or more phosphor elements that receive the energy from the said medium and emit it finally as a light of increased wave length. The phosphor elements are sometimes called "solutes" or "fluors."

In this combination, the phosphor, serving as the wave shifter ordinarily used for the final emission, is a material requiring a highly complicated and very costly synthesis.

Our invention provides a scintillator including, as the wave shifter, a material that is economical as compared to the usual light emitting wave shifter, unsatisfactory when used as the sole phosphor but effective, even when used in very small proportion with a primary phosphor, in emitting light of increased wave length in the near visible and visible spectra, and satisfactory in aging, pulse height, and rate of decay, i.e. shortness of time for decrease of fluorescence after ending of the exciting impulse.

Briefly stated, our invention comprises a conjugated plastic or liquid medium for absorbing the incident radiation, a primary phosphor element of usual kind dispersed therein, and a secondary phopshor or wave shifter that is a 1,3,5-substituted pyrazoline, the substituent groups being aryls that may themselves have substituents.

Examples of the polymeric plastics with conjugated bonds that we use to advantage are the various vinyl aromatic solid polymers including polystyrene, polyvinyltoluene, polyvinylnaphthalene, and polyisopropylstyrene. Other plastics that may be used are polymethyl and polyphenyl methacrylate and like acrylate polymers and copolymers of the monomers represented in the various polymers listed.

The medium used to absorb the ionizing radiation, when a liquid, is an aromatic conjugated bond liquid. Examples that illustrate the class to be used are the following hydrocarbons: benzene, toluene, xylene, phenylcyclohexane, ethylbenzene, triethylbenzene, mesitylene, n-butylbenzene, cumene, and p-cumene, all containing a single aryl nucleus, and liquid alkyl and aryl ethers thereof such as anisole, ethoxybenzene, diphenyl ether, and diphenyl phenyl ether.

Examples of the primary phosphors to be used and which form no part of this invention are the conjugated bond aromatic compounds illustrated by the following: p-terphenyl, m-terphenyl, trans stilbene, anthracene, 2,5-diphenyloxazole, p-p'-quaterphenyl, 2-phenyl-5-(4-biphenylyl)-1,3,4-oxadiazole, naphthalene, 1,1,4,4'-tetraphenyl-1,3-butadiene, 2,5-di(4-diphenylyl)oxazole, 2-(1-naphthyl)-5-phenyloxazole, and 2,2-p-phenylene-bis(5-phenyloxazole).

The said medium and the primary phosphor may be any ones of those that are conventional in scintillators.

Our wave shifter, the 1,3,5-substituted-2-pyrazoline, is of the formula

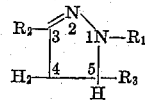

in which $R_1$, $R_2$, and $R_3$ represent at least one phenyl group and two other monovalent substituents selected from the group consisting of phenyl, p-methoxyphenyl, p-acetamidophenyl, p-hydroxyphenyl, 2-naphthyl, and p-biphenyl. Such wave shifters having suitable combinations of values for $R_1$, $R_2$, and $R_3$ are illustrated more specifically in the table that follows:

| Sample No. | $R_1$ | $R_2$ | $R_3$ |
|---|---|---|---|
| 1 | phenyl | phenyl | phenyl. |
| 2 | do | do | p-acetamidophenyl. |
| 3 | do | do | p-hydroxyphenyl. |
| 4 | do | p-methoxyphenyl | phenyl. |
| 5 | do | phenyl | p-methoxyphenyl. |
| 6 | do | p-methoxyphenyl | Do. |
| 7 | do | phenyl | p-biphenyl. |
| 8 | do | p-biphenyl | 1-naphthyl. |
| 9 | do | do | p-methoxyphenyl. |

Proportions that are satisfactory are 0.1–10 parts of the primary phosphor and 0.005–1 part and for most purposes about 0.05–0.2 part of the secondary phosphor or wave shifter for 100 parts of the said medium, all proportions being expressed as parts by weight. For satisfactory pulse heights, the substituted pyrazoline wave shifter requires the joint use of a primary phosphor that is not the pyrazoline compound.

As to conditions of compounding the plastic scintillator, the primary and the secondary phosphors are mixed with the monomers which are to be polymerized to form the solid plastic or they may be compounded with the prepolymerized monomer, as by mixing on hot rolls and then cooling. There are used no accelerator of polymerization of the monomers and no other additive that might interfere with functioning of the scintillator. The polymerization is effected thermally. Suitable conditions for such thermal polymerization are 100°–180° C. for about 1–2 days, the temperature and time being correlated so that the higher the temperature, the shorter the time required. In any event, the polymerization is continued until substantially complete, as shown by an increased viscosity of the mass, substantially no more exothermic reaction, precipitability of the resulting polymeric resin by methanol, and solidification of the mass on cooling.

The liquid scintillators are prepared by dissolving the appropriate amounts of primary and secondary solutes in the chosen ionization absorbing solvent.

Proceeding as described above, we have made solid plastic scintillators that show the following pulse heights as compared to those for comparable scintillators made as described but with the more costly to produce, conventional secondary phosphor, namely, 2,2-p-phenylene-bis(5-phenyloxazole), commonly referred to as POPOP. The incident ionizing radiation was beta rays from $Pa^{234}$. A 6291 Dumont photomultiplier tube was used for detecting the light output. The proportion of the wave shifter was 0.10% of the polymeric plastic.

1,3,5-TRIARYL-2-PYRAZOLINES AS WAVE SHIFTERS WITH 1% p-TERPHENYL AS PRIMARY PHOSPHOR IN POLYVINYLTOLUENE

| 1,3,5 Substituents as in Sample No. | Relative Average Pulse Heights vs. Anthracene Crystal Taken as 100 |
|---|---|
| 1 | 43 |
| 2 | 45 |
| 5 | 47 |
| 6 | 47 |
| 7 | 46 |
| POPOP | 44 |

Plastic scintillators were also prepared with the said pyrazolines as the only fluor. In these cases they do not function as wave shifters and the products are not examples of the present invention. The pulse heights obtained with 0.5% of the pyrazolines per 100 parts of polyvinyltoluene were less in every test, with $R_1$, $R_2$, and $R_3$, as shown in the Sample Nos. 1–7 above, than obtained with 0.1% of the same substituted pyrazolines and tabulated above.

Liquid scintillators were prepared with the various pyrazolines as the wave shifter and p-terphenyl as the primary fluor. These scintillators consisted of 6 grams of p-terphenyl and 0.5 gram of the selected 1,3,5-arylpyrazoline dissolved in 1 liter of toluene. These compositions were then compared with liquid scintillators consisting of the particular pyrazoline dissolved in toluene, so that in these cases the pyrazolines were not employed as wave shifters and consequently these comparison solutions are not examples of the present invention. The incident ionizing radiation was beta rays from $Pa^{234}$ and the Dumont 6291 photomultiplier tube was used for detecting the emitted light from 2 mls. of solution. The standard for comparison was a liquid scintillator consisting of 3 grams of 2,5-diphenyloxazole in 1 liter of toluene, to which is assigned a value of 1.0. The results are summarized in the table below. They show that, when the pyrazolines are used as primary solutes in liquid scintillators, relatively low pulse heights are obtained; when the same compounds are used as wave shifters in conjunction with another primary fluor, relatively large pulse heights are obtained.

1,3,5-TRIARYL-2-PYRAZOLINES AS PHOSPHORS IN TOLUENE

| 1,3,5 Substituents as in Sample No.— | Relative Pulse Height as Primary Fluor [1] | Relative Pulse Height as Wave Shifter [2] |
|---|---|---|
| 1 | 0.88 | 1.48 |
| 2 | 0.79 | 1.48 |
| 3 | 0.74 | 1.38 |
| 4 | 0.90 | 1.42 |
| 5 | 0.88 | 1.45 |
| 6 | 0.85 | 1.40 |
| 7 | 0.77 | 1.40 |
| 2,5-Diphenyloxazole (PPO) (Standard) | [3] 1.00 | |

[1] Data from Wiley, Jarboe, Hayes et al., J. Org. Chem. 23 732 (1958). Concentration of the pyrazoline used is that which gives the maximum relative pulse height for that system, i.e. 3–6.5 grams per liter of toluene.
[2] 6 grams of p-terphenyl as primary solute and 0.5 gram of the particular pyrazoline per liter of toluene.
[3] 3 grams per liter.

Example 1

A mixture is made of 100 parts of vinyltoluene monomer, 1 of terphenyl, and 0.1 of 1,3,5-triphenyl-2-pyrazoline. The vessel and contents are evacuated until the monomer begins to boil vigorously. At this point the evacuation is discontinued and nitrogen is bled into the vessel. This alternate evacuation and nitrogen flushing is repeated three times, to remove oxygen. The vessel is then closed and the contents heated at 150° C. for 19 hours and then cooled down slowly to 100° C. and then very slowly to room temperature.

A small piece of the cast molded and now solid plastic is then milled to a test disc of ½ in. diameter and then polished with #1 and #0 Buehler emery polishing paper.

Pulse height readings relative to an anthracene crystal of the same dimensions are taken using a scintillation counter, a 6291 Dumont photomultiplier tube, and $Pa^{234}$ as the source of beta radiation. The relative average pulse height was 43.

Example 2

The procedure of Example 1 is followed except that styrene is substituted in equal proportion for the vinyltoluene and the temperature of polymerization is that which causes mild reflux of the styrene, about 145° C., for 20 hours. The relative pulse height was 40.

Example 3

The procedure and composition of Example 1 or 2 is followed except that the monomers there used are replaced by any of the other conjugated bond monomers disclosed herein, the terphenyl by any other of the primary phosphor elements disclosed, and the secondary phosphor element or wave shifter by 1,2-diphenyl-3-p-methoxyphenyl-2-pyrazoline or by any alternative therefor that is shown herein.

Example 4

12 mg. of p-terphenyl and 1 mg. of 1,3-diphenyl-5-p-acetamidophenyl-2-pyrazoline are dissolved in 2 ml. of scintillation grade toluene added from a pipet. Two mls. of this solution is placed in a cylindrical glass cell ¾ inch in diameter and ¾ inch high and bombarded with beta rays from a $Pa^{234}$ source. The pulse height is measured relative to the said liquid standard. The relative pulse height was 1.48 compared with 1.0 for the standard.

Instead of the toluene in this example, there is used an equal proportion of benzene or xylene, of scintillation grade, that is non-fluorescent and suitably refined to practically pure condition.

For contrast, Example 4 was repeated omitting the p-terphenyl. The relative pulse height was 0.99.

It is essential that the substituted pyrazoline wave shifter be used in conjunction with a primary solute. The effect of the primary solute and the wave shifter used jointly is greater than that of either material used separately in amount equal to that of the two together.

It is to be understood that it is intended to cover all changes and modifications of the examples of the invention herein chosen for the purpose of illustration which do not constitute departures from the spirit and scope of the invention.

We claim:

1. A scintillator composition for detecting and measuring the intensity of ionizing radiation consisting essentially of an aromatic medium to absorb the incident radiation, a primary phosphor in the form of an aromatic compound dissolved in the said medium, and a 1,3,5-triaryl-2-pyrazoline dissolved in the medium and primary phosphor solution and serving as wave shifter, the proportions being about 0.1–10 parts by weight of the primary phosphor and 0.005–1 part of the substituted pyrazoline for 100 parts of the said medium.

2. The scintillator composition of claim 1, wherein the said wave shifter is 1,3,5-triphenyl-2-pyrazoline.

3. The scintillator composition of claim 1, wherein one of the aryl groups in the substituted pyrazoline is phenyl and the other two aryls therein are selected from the group consisting of phenyl, p-methoxyphenyl, p-acetamidophenyl, p-hydroxyphenyl, p-biphenyl, and alpha-naphthyl.

4. The scintillator composition of claim 3, wherein one of the said other aryls is p-methoxyphenyl.

References Cited in the file of this patent

UNITED STATES PATENTS

| 2,639,990 | Kendall | May 26, 1953 |
| 2,824,841 | Buck | Feb. 25, 1958 |
| 2,837,485 | Siegrist | June 3, 1958 |